United States Patent
Jing et al.

(10) Patent No.: US 10,120,883 B2
(45) Date of Patent: *Nov. 6, 2018

(54) USER INTERFACE FOR VIEWING CLUSTERS OF IMAGES

(71) Applicant: Microsoft Technology Licensing, LLC, Redmond, WA (US)

(72) Inventors: Feng Jing, Beijing (CN); Lei Zhang, Beijing (CN); Ming Jing Li, Beijing (CN); Wei-Ying Ma, Beijing (CN); Kefeng Deng, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 191 days.

This patent is subject to a terminal disclaimer.

(21) Appl. No.: 15/183,712

(22) Filed: Jun. 15, 2016

(65) Prior Publication Data

US 2016/0357741 A1 Dec. 8, 2016

Related U.S. Application Data

(63) Continuation of application No. 12/634,662, filed on Dec. 9, 2009, now Pat. No. 9,396,214, which is a
(Continued)

(51) Int. Cl.
*G06F 3/048* (2013.01)
*G06F 17/30* (2006.01)
(Continued)

(52) U.S. Cl.
CPC ........ *G06F 17/3028* (2013.01); *G06F 3/0482* (2013.01); *G06F 3/0485* (2013.01);
(Continued)

(58) Field of Classification Search
CPC combination set(s) only.
See application file for complete search history.

(56) References Cited

U.S. PATENT DOCUMENTS 4,888,646 A 12/1989 Umeda et al.
5,301,018 A 4/1994 Smidth et al.
(Continued)

FOREIGN PATENT DOCUMENTS

EP 0750254 A1 12/1996
EP 0784259 A2 7/1997
(Continued)

OTHER PUBLICATIONS

Kherfi, et al., "Image Retrieval from the World Wide Web Issues, Techniques and Systems,", In Journal ACM Computing Surveys (CSUR), vol. 36, Issue 1, Mar. 1, 2004, pp. 35-67.
(Continued)

*Primary Examiner* — Hien L Duong
(74) *Attorney, Agent, or Firm* — Schwegman Lundberg & Woessner, P.A.

(57) ABSTRACT

Method and system for providing a user interface for presenting images of clusters of an image search result is provided. The user interface system displays the search result in a cluster/view form using a cluster panel and a view panel. The cluster panel contains a cluster area for each cluster. The view panel may contain thumbnails of images of the search result in a list view or a mix view. When a user selects a cluster area from the cluster panel, the user interface system displays a list view of thumbnails for that cluster in the view panel. The user interface system may display a thumbnail list near a cluster area of the cluster panel. The thumbnail list contains mini-thumbnails of the images of the selected cluster. The user interface system may also display a detail view of an image in the view panel when a user selects an image.

20 Claims, 15 Drawing Sheets

Related U.S. Application Data continuation of application No. 11/337,945, filed on Jan. 23, 2006, now Pat. No. 7,644,373.

(51) Int. Cl.
  *G06F 3/0482* (2013.01)
  *G06F 3/0485* (2013.01)
(52) U.S. Cl.
  CPC .... *G06F 17/3053* (2013.01); *G06F 17/30265* (2013.01); *G06F 17/30274* (2013.01)

(56) References Cited

U.S. PATENT DOCUMENTS

| | | | |
|---|---|---|---|
| 5,579,471 | A | 11/1996 | Barber et al. |
| 5,642,433 | A | 6/1997 | Lee et al. |
| 5,751,286 | A | 5/1998 | Barber et al. |
| 5,802,361 | A | 9/1998 | Wang et al. |
| 5,870,740 | A | 2/1999 | Rose et al. |
| 5,875,446 | A | 2/1999 | Brown et al. |
| 5,937,422 | A | 8/1999 | Nelson et al. |
| 5,987,456 | A | 11/1999 | Ravela et al. |
| 6,006,218 | A | 12/1999 | Breese et al. |
| 6,041,323 | A | 3/2000 | Kubota |
| 6,097,389 | A | 8/2000 | Morris et al. |
| 6,115,717 | A | 9/2000 | Mehrotra et al. |
| 6,128,613 | A | 10/2000 | Wong et al. |
| 6,134,541 | A | 10/2000 | Castelli et al. |
| 6,167,397 | A | 12/2000 | Jacobson et al. |
| 6,240,378 | B1 | 5/2001 | Imanaka et al. |
| 6,256,623 | B1 | 7/2001 | Jones |
| 6,317,748 | B1 | 11/2001 | Menzies et al. |
| 6,321,226 | B1 | 11/2001 | Garber et al. |
| 6,363,373 | B1 | 3/2002 | Steinkraus |
| 6,370,527 | B1 | 4/2002 | Singhal |
| 6,445,834 | B1 | 9/2002 | Rising, III |
| 6,470,307 | B1 | 10/2002 | Turney |
| 6,473,753 | B1 | 10/2002 | Katariya et al. |
| 6,493,719 | B1 | 12/2002 | Booth et al. |
| 6,522,782 | B2 | 2/2003 | Pass et al. |
| 6,523,021 | B1 | 2/2003 | Monberg et al. |
| 6,549,897 | B1 | 4/2003 | Katariya et al. |
| 6,556,710 | B2 | 4/2003 | Pass et al. |
| 6,567,936 | B1 | 5/2003 | Yang et al. |
| 6,578,032 | B1 | 6/2003 | Chandrasekar et al. |
| 6,606,659 | B1 | 8/2003 | Hegli et al. |
| 6,643,641 | B1 | 11/2003 | Snyder |
| 6,704,729 | B1 | 3/2004 | Klein et al. |
| 6,728,752 | B1 | 4/2004 | Chen et al. |
| 6,748,387 | B2 | 6/2004 | Garber et al. |
| 6,748,398 | B2 | 6/2004 | Zhang et al. |
| 6,766,320 | B1 | 7/2004 | Wang et al. |
| 6,775,666 | B1 | 8/2004 | Stumpf et al. |
| 6,816,850 | B2 | 11/2004 | Culliss |
| 6,823,335 | B2 | 11/2004 | Ikeda |
| 6,847,733 | B2 | 1/2005 | Savakis et al. |
| 6,892,245 | B1 | 5/2005 | Crump et al. |
| 6,895,552 | B1 | 5/2005 | Balabanovic et al. |
| 6,901,411 | B2 | 5/2005 | Li et al. |
| 6,920,448 | B2 | 7/2005 | Kincaid et al. |
| 6,944,612 | B2 | 9/2005 | Roustant et al. |
| 6,970,923 | B1 | 11/2005 | Mukaiyama et al. |
| 6,978,275 | B2 | 12/2005 | Castellanos et al. |
| 7,010,751 | B2 | 3/2006 | Shneiderman |
| 7,017,114 | B2 | 3/2006 | Guo et al. |
| 7,047,482 | B1 | 5/2006 | Odom |
| 7,051,019 | B1 | 5/2006 | Land et al. |
| 7,065,520 | B2 | 6/2006 | Langford |
| 7,099,860 | B1 | 8/2006 | Liu et al. |
| 7,111,002 | B2 | 9/2006 | Zhang et al. |
| 7,113,944 | B2 | 9/2006 | Zhang et al. |
| 7,158,878 | B2 | 1/2007 | Rasmussen et al. |
| 7,162,468 | B2 | 1/2007 | Schwartz et al. |
| 7,287,012 | B2 | 10/2007 | Corston et al. |
| 7,349,899 | B2 | 3/2008 | Namba |
| 7,430,566 | B2 | 9/2008 | Li et al. |
| 7,492,921 | B2 | 2/2009 | Foote |
| 7,499,916 | B2 | 3/2009 | Liu et al. |
| 7,725,451 | B2 | 5/2010 | Jing et al. |
| 2001/0020238 | A1 | 9/2001 | Tsuda |
| 2001/0049700 | A1 | 12/2001 | Ichikura |
| 2002/0035573 | A1 | 3/2002 | Black et al. |
| 2002/0042793 | A1 | 4/2002 | Choi |
| 2002/0042847 | A1 | 4/2002 | Takats et al. |
| 2002/0052894 | A1 | 5/2002 | Bourdoncle et al. |
| 2002/0055936 | A1 | 5/2002 | Cheng et al. |
| 2002/0103890 | A1 | 8/2002 | Chaudhuri et al. |
| 2002/0194166 | A1 | 12/2002 | Fowler |
| 2003/0009469 | A1 | 1/2003 | Platt et al. |
| 2003/0023600 | A1 | 1/2003 | Nagamura et al. |
| 2003/0061334 | A1 | 3/2003 | Hirata et al. |
| 2003/0063131 | A1 | 4/2003 | Ma |
| 2003/0126235 | A1 | 7/2003 | Chandrasekar et al. |
| 2003/0140033 | A1 | 7/2003 | Iizuka et al. |
| 2003/0142123 | A1 | 7/2003 | Malamud et al. |
| 2003/0144994 | A1 | 7/2003 | Wen et al. |
| 2004/0015461 | A1 | 1/2004 | Lo |
| 2004/0044469 | A1 | 3/2004 | Bender et al. |
| 2004/0066414 | A1* | 4/2004 | Czerwinski ........... G06F 3/0481 715/781 |
| 2004/0111438 | A1 | 6/2004 | Chitrapura et al. |
| 2004/0225667 | A1 | 11/2004 | Hu et al. |
| 2004/0236760 | A1 | 11/2004 | Arkeketa et al. |
| 2004/0249774 | A1 | 12/2004 | Caid et al. |
| 2004/0267740 | A1 | 12/2004 | Liu et al. |
| 2005/0015366 | A1 | 1/2005 | Carrasco et al. |
| 2005/0022106 | A1 | 1/2005 | Kawai et al. |
| 2005/0027377 | A1 | 2/2005 | Lucas et al. |
| 2005/0065959 | A1 | 3/2005 | Smith et al. |
| 2005/0086337 | A1 | 4/2005 | Quittek et al. |
| 2005/0097475 | A1 | 5/2005 | Makioka et al. |
| 2005/0108200 | A1 | 5/2005 | Meik et al. |
| 2005/0141497 | A1* | 6/2005 | Wu .................. H04L 41/00 370/389 |
| 2005/0144158 | A1 | 6/2005 | Capper et al. |
| 2005/0165841 | A1 | 7/2005 | Kasperkiewicz et al. |
| 2005/0188326 | A1 | 8/2005 | Ikeda |
| 2006/0025985 | A1 | 2/2006 | Vinberg et al. |
| 2006/0026152 | A1 | 2/2006 | Zeng et al. |
| 2006/0117002 | A1* | 6/2006 | Swen ............... G06F 17/30707 |
| 2006/0117003 | A1 | 6/2006 | Ortega et al. |
| 2006/0204142 | A1 | 9/2006 | West et al. |
| 2006/0242126 | A1 | 10/2006 | Fitzhugh |
| 2006/0242178 | A1 | 10/2006 | Butterfield et al. |
| 2007/0005320 | A1 | 1/2007 | Vinberg et al. |
| 2007/0073748 | A1 | 3/2007 | Barney |
| 2007/0133947 | A1 | 6/2007 | Armitage et al. |
| 2007/0174269 | A1 | 7/2007 | Jing et al. |
| 2007/0174790 | A1 | 7/2007 | Jing et al. |
| 2007/0174865 | A1 | 7/2007 | Jing et al. |
| 2007/0174872 | A1 | 7/2007 | Jing et al. |
| 2007/0185866 | A1 | 8/2007 | Evans |
| 2007/0198182 | A1 | 8/2007 | Singh |
| 2007/0209025 | A1 | 9/2007 | Jing et al. |
| 2008/0086468 | A1 | 4/2008 | Jing et al. |
| 2008/0086686 | A1 | 4/2008 | Jing et al. |
| 2008/0189253 | A1 | 8/2008 | Oliver et al. |

FOREIGN PATENT DOCUMENTS

| | | |
|---|---|---|
| KR | 1020010105051 A | 11/2001 |
| KR | 1020020000680 A | 1/2002 |
| KR | 1020030023950 A | 3/2003 |

OTHER PUBLICATIONS

Krishnapuram, et al., "Low-Complexity Fuzzy Relational Clustering Algorithms for Web Mining", In Proceedings of IEEE Transactions on Fuzzy Systems, vol. 9, Issue 4, Aug. 7, 2002, 28 Pages.
Kummamuru, et al., "A Hierarchical Monothetic Document Clustering Algorithm for Summarization and Browsing Search Results", In Proceedings of the 13th international conference on World Wide Web, May 17, 2004, pp. 658-665.

(56) References Cited

OTHER PUBLICATIONS

Lempel, et al., "PicASHOW: Pictorial Authority Search by Hyperlinks on the Web", In Journal ACM Transactions on Information Systems (TOIS), vol. 20, Issue 1, Jan. 1, 2002, pp. 438-448.
Li, et al., "Grouping www Image Search Results by Novel Inhomogeneous Clustering", In Proceedings of the 11th International Multimedia Modelling Conference, Jan. 12, 2005, 7 Pages.
Li, et al., "Intuitive and Effective Interfaces for WWW Image Search Engine", In Proceedings of the 12th annual ACM International conference on Multimedia, Oct. 10, 2004, 4 Pages.
Liu, et al., "Effective Browsing of Web Image Search Results", In Proceedings of the 6th ACM SIGMM international workshop on Multimedia information retrieval, Oct. 15, 2004, 7 Pages.
Zhang, L., "Enjoy High Quality Photos in Vertical Image Search Engine", Submitted to the SIGCHI 2006 Conference on Human Factors in Computing Systems, 2006, 10 Pages.
Liu, et al., "Mining Topic—Specific Concepts and Definitions on the Web", In Proceedings of the 12th international conference on World Wide Web, May 20, 2003, pp. 251-260.
Luo, et al., "A World Wide Web Based Image Search Engine Using Text and Image Content Features", In Proceedings of the Electronic Imafing Science and Technology (SPIE), vol. 5018, Jan. 2003, pp. 123-130.
Maña-López, et al., "Multidocument Summarization: Added Value to Clustering in Interactive Retrieval", In Journal ACM Transactions on Information Systems (TOIS), vol. 22, Issue 2, Apr. 1, 2004, pp. 215-241.
Mukherjea, et al., "Using Clustering and Visualization for Refining the Results of a WWW Image Search Engine", In Proceedings of the 1998 workshop on New paradigms in information visualization and manipulation, Nov. 1, 1998, pp. 29-35.
Mysore, et al., "DIOGENES: A Distributed Search Agent", Technical Report CSE-2003-24, Department of Computer Science and Engineering, May, 2003, 80 Pages.
Nie, et al., "Object-Level Ranking: Bringing Order to Web Objects", In Proceedings of the 14th international conference on World Wide Web, May 10, 2005, 8 Pages.
Nie, et al., "Object-level Web Information Retrieval", In Proceedings of Technical Report of Microsoft Research, 2005, 8 Pages.
Ong, et al., "FOCI: Flexible Organizer for Competitive Intelligence", In Proceedings of the tenth international conference on Information and knowledge management, Oct. 5, 2001, 3 Pages.
Page, et al., "The PageRank Citation Ranking—Bringing Order to the Web", In Technical Report of Stanford InfoLab Publication Server, Jan. 29, 1998, 17 Pages.
"International Search Report and Written Opinion Issued in PCT Application No. PCT/US2007/079983", dated Jan. 16, 2008, 10 Pages.
Roussinov, et al., "Visualizing Internet Search Results with Adaptive Self-Organizing Maps", In Proceedings of the 22nd annual international ACM SIGIR conference on Research and development in information retrieval, Aug. 1, 1999, 2 Pages.
Rui, et al., "Image Retrieval: Current Techniques, Promising Directions and Open Issues", In Journal of visual communication and image representation, vol. 10, Issue 1, Mar. 1, 1999, pp. 39-62.
Sarkar, et al., "Graphical Fisheye Views", In Magazine Communications of the ACM, vol. 37, Issue 12, Dec. 1, 1994, pp. 73-84.
Savakis, et al., "Evaluation of image appeal in consumer photography", In Proceedings SPIE Human Vision and Electronic Imaging V, Jan. 2000, 10 Pages.
Schwartz, Steve, "Chapter 4: Organizing Pictures", In Visual Quick Project Guide: Organizing and Editing Your Photos with Picasa, Published by Peachpit Press, May 10, 2005, 22 Pages.
Sclaroff, et al., "ImageRover: A Content-Based Image Browser for the World Wide Web", In Proceedings. IEEE Workshop on Content-Based Access of Image and Video Libraries, Jun. 20, 1997, 8 Pages.
Sclaroff, et al., "Unifying Textual and Visual Cues for Content-Based Image Retrieval on the World Wide Web", In Journal Computer Vision and Image Understanding, vol. 75, Issue 1, Aug. 1999, pp. 86-98.

Shen, et al., "Giving Meanings to WWW Images", In Proceedings of the eighth ACM international conference on Multimedia, Oct. 30, 2000, pp. 39-47.
Smeulders, et al., "Content-Based Image Retrieval at the End of the Early Years", In Journal of IEEE Transactions on Pattern Analysis and Machine, vol. 22, Issue 12, Dec. 1, 2000, pp. 1349-1380.
Smith, et al., "Visually Searching the Web for Content", In Journal of IEEE MultiMedia, vol. 4, Issue 3, Jul. 1, 1997, pp. 12-20.
Sullivan, Danny, "Hitwise Search Engine Ratings", In Proceedings of Search Engine Watch, Incisive Interactive Marketing LLC, Aug. 23, 2005, 3 Pages.
Susstrunk, et al., "Color Image Quality on the Internet", In Proceedings of Electronic Imaging, International Society for Optics and Photonics, vol. 5304, Dec. 22, 2003, 14 Pages.
Teevan, et al., "The Perfect Search Engine Is Not Enough: A Study of Orienteering Behavior in Directed Search", In Proceedings of the SIGCHI Conference on Human Factors in Computing Systems, Apr. 24, 2004, pp. 415-422.
Tong, et al., "Classification of Digital Photos Taken by Photographers or Home", In Proceedings of the 5th Pacific Rim conference on Advances in Multimedia Information Processing—vol. Part I, Nov. 30, 2004, 8 Pages.
Toyama, et al., "Geographic Location Tags on Digital Images", In Proceedings of the eleventh ACM international conference on Multimedia, Nov. 2, 2003, 11 Pages.
Vlachos, et al., "Indentifying Similarities, Periodicties and Bursts for Online Search Queries", In Proceedings of the 2004 ACM SIGMOD international conference on Management of data, Jun. 13, 2004, 12 Pages.
Wang, et al., "Evaluating Contents-Link Coupled Web Page Clustering for Web Search Results", In Proceedings of the eleventh international conference on Information and knowledge management, Nov. 4, 2002, pp. 499-506.
Wang, et al., "Grouping Web Image Search Result", In Proceedings of the 12th annual ACM international conference on Multimedia, Oct. 10, 2004, pp. 436-439.
Wang, et al., "Large-Scale Duplicate Detection for Web Image Search", In IEEE International Conference on Multimedia and Expo, Jul. 9, 2006, 4 Pages.
White, et al., "Similarity Indexing: Algorithms and Performance", Proceedings of Conference on Storage and Retrieval for Image and Video Databases (SPIE), vol. 2670, San Jose, CA, Mar. 13, 1996, pp. 62-73.
Wies, Rene, "Policies in Network and Systems Management—Formal Definition and Architecture", In Journal of Network and Systems Management, Plenum Publishing Corporation, vol. 2, No. 1, Mar. 1994, 17 Pages.
Woodruff, et al., "Using Thumbnails to Search the Web", In Proceedings of the SIGCHI Conference on Human Factors in Computing Systems, Mar. 1, 2001, 8 Pages.
Wu, et al., "Finding More Useful Information Faster from Web Search Results", In Proceedings of the twelfth international conference on Information and knowledge management, Nov. 3, 2003, pp. 568-571.
Xi, et al., "Link Fusion: A Unified Link Analysis Framework for Multi-Type Interrelated Data Objects", In Proceedings of the 13th international conference on World Wide Web, May 17, 2004, pp. 319-327.
Yee, et al., "Faceted Metadata for Image Search and Browsing", In Proceedings of the SIGCHI Conference on Human Factors in Computing Systems, Apr. 5, 2003, 8 Pages.
Zamir, et al., "Web Document Clustering—A Feasibility Demonstration", In Proceedings of the 21st annual international ACM SIGIR conference on Research and development in information retrieval, Aug. 1, 1998, 9 Pages.
Zeng, et al., "Learning to Cluster Web Search Results", In Proceedings of the 27th annual international ACM SIGIR conference on Research and development in information retrieval, Jul. 25, 2004, 8 Pages.
"Altavista Image", Retrieved from «http://web.archive.org/web/20060422092837/http://www.altavista.com/», Retrieved Date: Apr. 22, 2006, 1 Page.

(56) References Cited

OTHER PUBLICATIONS

"Citeseer, Scientific Literature Digital Library", Retrieved from «http://web.archive.org/web/20060701014444/http://citeseerist.psu.edu/», Jul. 1, 2006, 1 Page.
"Ditto", Retrieved from «http://web.archive.org/web/20060712142218/http://www.ditto.com/», Jul. 12, 2006, 1 Page.
"Flickr", Retrieved from «https://web.archive.org/web/20050218030404/http://flickr.com/», Feb. 18, 2005, 5 Pages.
"Formula for Calculating the Top Rated 250 Titles in imdb", Retrieved from «http://web.archive.org/web/20060706043658/http://www.imdb.com/chart/top», Jul. 6, 2006, 8 Pages.
"Froogle, Google Product Search", Retrieved from «http://web.archive.org/web/20050714032626/http://froogle.google.com/», Jul. 14, 2005, 1 Page.
"Google Image Search", Retrieved from «http://images.google.com», Retrieved Date: Jun. 10, 2007, 1 Page.
"Google Maps, Google Local Search", Retrieved from «http://local.google.com/», Retrieved Date: Jul. 14, 2006, 1 Page.
"Google Scholar Paper Search", Retrieved from «http://Scholar.google.com», Retrieved Date: Jul. 13, 2006, 1 Pages.
"Google Web Search", Retrieved from «http://www.google.com», Retrieved Date: Jun. 7, 2007, 3 Pages.
"GoogleNews, Google News Search", Retrieved from «http://news.google.com», Retrieved Date: Jul. 14, 2006, 4 Pages.
"GoogleVideo, Google Video Search", Retrieved from «http://web.archive.org/web/20060714183439/http://video.google.com/», retrieved Date: Jul. 14, 2006, 2 Pages.
"MSRA Clustering Search", Retrieved from «http://web.archive.org/web/20070613192108/http://rwsm.directtaps.net/», Retrieved Date: Jun. 13, 2007, 1 Page.
"Photosig", Retrieved from «http://www.photosig.com», Retrieved Date: Aug. 17, 2006, 3 Pages.
"PicSearch", Retrieved from «http://www.picsearch.com/», Jul. 14, 2006, 1 Page.
"Picsearch Image Search", Retrieved from «http://www.picsearch.com/index.cgi?q=tiger», Retrieved Date: Jan. 5, 2006, 2 Pages.
"Vivisimo Clustering Search", Retrieved from «https://web.archive.org/web/20070629130814/http://search.vivisimo.com/», Retrieved Date: Jun. 7, 2007, 4 Pages.
"Yahoo Homepage Search", Retrieved from «http://www.yahoo.com/», Jun. 7, 2007, 1 Pages.
"Yahoo Image Search", Retrieved from «http://images.search.yahoo.com/», Retrieved Date: Jun. 7, 2007, 3 Pages.
"Final Office Action Issued in U.S. Appl. No. 11/337,945", dated Oct. 16, 2008, 20 Pages.
"Non Final Office Action Issued in U.S. Appl. No. 11/337,945", dated Mar. 6, 2008, 13 Pages.
"Notice of Allowance Issued in U.S. Appl. No. 11/337,945", dated Oct. 21, 2009, 4 Pages.
"Non Final Office Action Issued in U.S. Appl. No. 11/337,945", dated May 26, 2009, 11 Pages.
"Final Office Action Issued in U.S. Appl. No. 12/634,662", dated Jul. 19, 2013, 14 Pages.
"Final Office Action Issued in U.S. Appl. No. 12/634,662", dated May 8, 2014, 28 Pages.
"Final Office Action Issued in U.S. Appl. No. 12/634,662", dated Oct. 7, 2015, 27 Pages.
"Non Final Office Action Issued in U.S. Appl. No. 12/634,662", dated Jun. 4, 2015, 25 Pages.
"Non Final Office Action Issued in U.S. Appl. No. 12/634,662", dated Dec. 6, 2013, 22 Pages.
"Non Final Office Action Issued in U.S. Appl. No. 12/634,662", dated Mar. 1, 2013, 14 Pages.
"Notice of Allowance Issued in U.S. Appl. No. 12/634,662", dated Mar. 22, 2016, 9 Pages.

Brin, et al., "The Anatomy of a Large-Scale Hypertextual (Web) Search Engine", In Proceedings of the seventh international conference on World Wide Web, Apr. 1, 1998, 20 Pages.
Broder, Andrei, "A Taxonomy of Web Search", In ACM SIGIR Forum, vol. 36, Issue 2, Sep. 1, 2002, 8 Pages.
Cai, et al., "Hierarchical Clustering of WWW Image Search Results Using Visual, Textual and Link Analysis", In Proceedings of the 12th annual ACM international conference on Multimedia, Oct. 10, 2004, 8 Pages.
Chang, et al., "Image Information Systems: Where do we go from here?", In Proceedings of IEEE Transactions on Knowledge and Data Engineering, vol. 4, Issue 5, Oct. 1992, pp. 431-442.
Chau, et al., "Personalized Spiders for Web Search and Analysis", In Proceedings of the 1st ACM/IEEE-CS joint conference on Digital libraries, Jan. 1, 2001, 9 Pages.
Chen, et al., "Bringing Order to the Web: Automatically Categorizing Search Results", In Proceedings of the SIGCHI conference on Human Factors in Computing Systems, Apr. 1, 2000, 9 Pages.
Chen, et al., "iFind: A Web Image Search Engine", In Proceedings of the 24th annual international ACM SIGIR conference on Research and development in information retrieval, Sep. 1, 2001, 1 Page.
Dumais, "Optimizing Search by Showing Results in Context", In Proceedings of the SIGCHI Conference on Human Factors in Computing Systems, Mar. 1, 2001, 8 Pages.
Ferragina, et al., "The Anatomy of a Clustering Engine for Web-Page Snippets", In Proceedings of Fourth IEEE International Conference on Data Mining ICDM '04, Tech Report: TR-04-05, Jan. 29, 2004, 21 Pages.
Frankel, et al., "WebSeer: An Image Search Engine for the World Wide Web", In Technical Report 96-14, University of Chicago, Aug. 1, 1996, 24 Pages.
Fullford, et al., "A Federation Tool: Using the Management Object Model (MOM) to Manage, Monitor and Control an HLA Federation", In Proceedings of Spring Simulation Interoperability Workshop, Mar. 1999, 5 Pages.
Glance, Natalie S., "Community Search Assistant", In Proceedings of the 6th international conference on Intelligent user interfaces, Jan. 1, 2001, 8 Pages.
Halkidi, et al., "THESUS: Organizing Web document Collections Based on Link Semantics", In Journal the International Journal on Very Large Data Bases (VLDB J), vol. 12 Issue, Nov. 1, 2003, 13 Pages.
Han, et al., "Intelligent Metasearch Engine for Knowledge Management", In Proceedings of the twelfth international conference on Information and knowledge management, Nov. 3, 2003, pp. 492-495.
He, et al., "Imagerank : Spectral Techniques for Structural Analysis of Image Database", In Proceedings of the 2003 International Conference on Multimedia and Expo, vol. 2, Jul. 6, 2003, pp. 25-28.
Hearst, et al., "Reexamining the Cluster Hypothesis: Scatter/Gather on—Retrieval Results", In Proceedings of the 19th annual international ACM SIGIR conference on Research and development in information retrieval, Aug. 18, 1996, pp. 76-84.
Huang, et al., "Force-Transfer: A New Approach to Removing Overlapping Nodes in Graph Layout", In Proceedings of the 26th Australasian computer science conference, vol. 16, Feb. 1, 2003, 10 Pages.
Huang, et al., "Image Indexing Using Color Correlograms", In Proceedings of the 1997 Conference on Computer Vision and Pattern Recognition (CVPR '97), Jun. 17, 1997, 7 Pages.
Indurkhya, et al., "Solving Regression Problems with Rule-based Classifiers", In Proceedings of the seventh ACM SIGKDD international conference on Knowledge discovery and data mining, Aug. 26, 2001, pp. 287-292.
Jansen, et al., "Real Life Information Retrieval: A Study of User Queries on the Web", In Proceedings of ACM SIGIR Forum, vol. 32, Issue 1, Apr. 1, 1998, 12 Pages.

\* cited by examiner

USER INTERFACE FOR VIEWING CLUSTERS OF IMAGES

CROSS REFERENCE TO RELATED APPLICATION

This application is a continuation application of U.S. patent application Ser. No. 12/634,662, filed on Jan. 23, 2006, which is a continuation application of U.S. Pat. No. 7,644,373, issued on Jan. 5, 2010, which are incorporated herein in their entirety by reference.

BACKGROUND

Many search engine services, such as Google and Overture, provide for searching for information that is accessible via the Internet. These search engine services allow users to search for display pages, such as web pages, that may be of interest to users. After a user submits a search request (also referred to as a "query") that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of base web pages to identify all web pages that are accessible through those base web pages. The keywords of any particular web page can be identified using various well-known information retrieval techniques, such as identifying the words of a headline, the words supplied in the metadata of the web page, the words that are highlighted, and so on. The search engine service may generate a relevance score to indicate how related the information of the web page may be to the search request. The search engine service then displays to the user links to those web pages in an order that is based on their relevance.

Several search engine services also provide for searching for images that are available on the Internet. These image search engines typically generate a mapping of keywords to images by crawling the web in much the same way as described above for mapping keywords to web pages. An image search engine service can identify keywords based on text of the web pages that contain the images. An image search engine may also gather keywords from metadata associated with images of web-based image forums, which are an increasingly popular mechanism for people to publish their photographs and other images. An image forum allows users to upload their photographs and requires the users to provide associated metadata such as title, camera setting, category, and description. The image forums typically allow reviewers to rate each of the uploaded images and thus have ratings on the quality of the images. Regardless of how the mappings are generated, an image search engine service inputs an image query and uses the mapping to find images that are related to the image query. An image search engine service may identify thousands of images that are related to an image query and presents thumbnails of the related images. To help a user view the images, an image search engine service may order the thumbnails based on relevance of the images to the image query. An image search engine service may also limit the number of images that are provided to a few hundred of the most relevant images so as not to overwhelm the viewer. Unfortunately, the relevance determination may not be particularly accurate because image queries may be ambiguous (e.g., "tiger" may represent the animal or the golfer), the keywords derived from web pages may not be very related to an image of the web page (e.g., a web page can contain many unrelated images), and so on.

A typical image search engine service may also suggest additional image queries to a user. For example, if a user submits "tiger" as an image query, an image search engine service may display thumbnails of images relating to "tiger" in relevance order. That image search engine service may also display the text of suggested image queries, such as "white tiger," "mystical tiger," "Tiger Woods," and so on. When a user selects one of the suggested image queries, that image search engine service searches for images relating to the selected image query and displays the thumbnails of the images as the search result. Such a user interface has several disadvantages. First, a user may not know from the text of the suggested image query whether the images relating to the suggested image query will be of interest to the user. For example, a user may not know from the suggested image query "mystical tiger" what type of images will be in the search result. Second, the ordering of the thumbnails based on relevance of the images to the image query may result in thumbnails for only one type of image being displayed (e.g., a Bengal tiger) in the first few pages of results. Thus, the user may need to view many pages to get a feel for the different types of images (e.g., a mystical tiger) that are related to the image query.

SUMMARY

A method and system for providing a user interface for presenting images of clusters of an image search result is provided. The user interface system is provided with clusters of images as the search result of an image query. The user interface system displays the search result in a cluster/view form using a cluster panel and a view panel. The cluster panel contains a cluster area for each cluster. The cluster area for a cluster may include the name of the cluster and mini-thumbnails of some of the images of the cluster. The view panel may contain thumbnails of images of the search result in a lucky view or a mix view. In the lucky view, the view panel contains thumbnails of images of a single cluster that may be arranged in a grid. In the mix view, the view panel contains thumbnails of images from multiple clusters that may also be arranged in a grid. When a user selects a cluster area from the cluster panel, the user interface system displays a list view of thumbnails for that cluster in the view panel.

The user interface system may display a thumbnail list near a cluster area of the cluster panel. The thumbnail list contains mini-thumbnails of the images of the selected cluster. When a user selects a mini-thumbnail from the thumbnail list, the user interface system may display a detail view of the corresponding image in the view panel.

The user interface system displays a detail view of an image in the view panel when a user selects an image. The detail view may include metadata associated with the image such as camera setting, photographer, and so on. The user interface system may also display a thumbnail scroll list in the view panel along with the detail view. A thumbnail scroll list contains mini-thumbnails of images. The user interface may select images to be included in a thumbnail scroll list based on the context in which the image of the detail view was selected.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
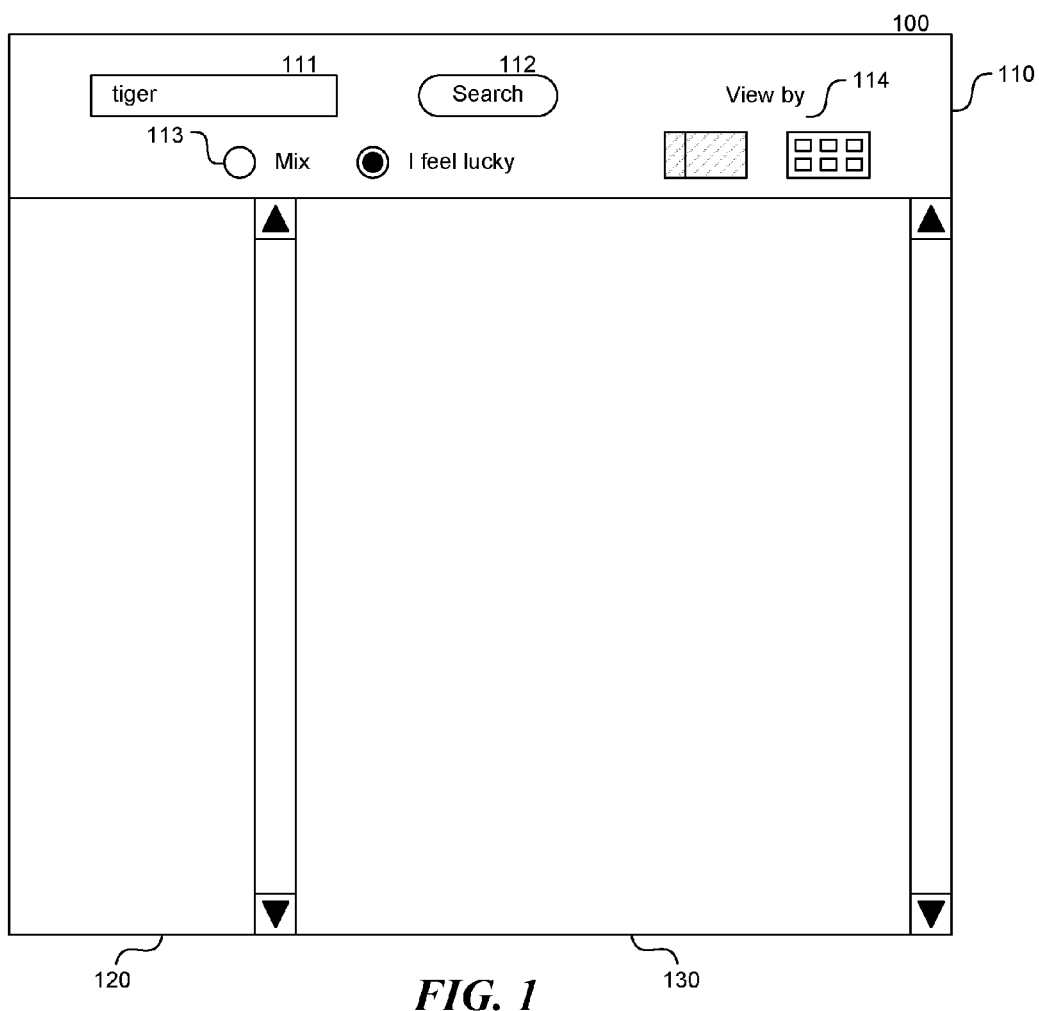
FIG. 1 illustrates a display page for submitting an image query in one embodiment.

A method and system for providing a user interface for presenting images of clusters of an image search result is provided. In one embodiment, the user interface system is provided with clusters of images as the search result of an image query. Each cluster of images includes a cluster name and for each image of the cluster, a thumbnail of the image, metadata associated with the image, and a link to the image. The images within a cluster may be ordered based on their relevance to the image query. The user interface system displays the search result in a cluster/view form using a cluster panel and a view panel. The cluster panel contains a cluster area for each cluster. The cluster area for a cluster may include the name of the cluster and mini-thumbnails of some of the images of the cluster. The cluster areas of the cluster panel may be ordered based on a relevance score of the images of the cluster to the image query or may be ordered based on the number of images in the cluster. The view panel may contain thumbnails of images of the search result in a list view or a mix view. In the list view, the view panel contains thumbnails of images of a single cluster that may be arranged in a grid. The thumbnails in list view may be ordered based on relevance of the corresponding images to the image query. In the mix view, the view panel contains thumbnails of images from multiple clusters that may also be arranged in a grid. The thumbnails in mix view may be ordered in an image relevance to cluster order in which the thumbnail of the most relevant image of each cluster is ordered first, followed by the thumbnail of the second most relevant image of each image cluster, and so on. The list view thus provides a view of the images of a single cluster, and the mix view provides a view of the most relevant images from each cluster. Moreover, the cluster panel allows a user to get an understanding of the images of each cluster from the mini-thumbnails of the cluster areas. When a user selects a cluster area from the cluster panel, the user interface system displays a list view of thumbnails for that cluster in the view panel. The cluster panel and the view panel may contain scrollbars for scrolling the content of the panel.

In one embodiment, the user interface system may display a thumbnail list near a cluster area of the cluster panel. When a user selects a cluster (e.g., by right clicking on a cluster area), the user interface system displays a thumbnail list that may overlay a portion of the cluster panel and the view panel. The thumbnail list contains mini-thumbnails of the images of the selected cluster. For example, the user interface system may display in a rectangular area the mini-thumbnails for the 30 images with the highest relevance. The user interface system may position the rectangular area just below and to the right of the cluster area for the selected cluster. When a user selects a mini-thumbnail from the thumbnail list, the user interface system may display a detail view of the corresponding image in the view panel. If the user selects multiple mini-thumbnails from the thumbnail list, the user interface system may display thumbnails of the corresponding images in the view panel. The user interface system may also provide a scrollbar for the thumbnail list when a cluster contains more images than can be effectively displayed as mini-thumbnails at the same time.

In one embodiment, the user interface system displays a detail view of an image in the view panel when a user selects an image (e.g., by selecting a thumbnail from the view panel or mini-thumbnail from a thumbnail list). The detail view may include metadata associated with the image such as camera setting, photographer, and so on. The user interface system may also display a thumbnail scroll list in the view panel along with the detail view. A thumbnail scroll list contains mini-thumbnails of images. A user can scroll through the mini-thumbnails and select a mini-thumbnail of interest. When a user selects a mini-thumbnail, the user interface system displays in the view panel a detail view of the image associated with the selected mini-thumbnail. The user interface may select images to be included in a thumbnail scroll list based on the context in which the image of the detail view was selected. For example, if the image for the detail view was selected from a thumbnail within the view panel, then the images of the other thumbnails displayed in the view panel would be included in the thumbnail scroll list. If the view panel was in list view, then the images of the same cluster would be included in the thumbnail scroll list. If the view panel was in mix view, then the images of multiple clusters would be included in the thumbnail scroll list. If the image for the detail view was selected from a thumbnail list, then the images of the same cluster would be included in the thumbnail scroll list.

FIG. 1 illustrates a display page for submitting an image query in one embodiment. The display page 100 includes a query panel 110, a cluster panel 120, and a view panel 130. The cluster panel and view panel may be initially empty. A user submits an image query by entering the text of the image query in a query box 111 and selecting the search button 112. The view by area 114 is used to indicate whether the clusters should be presented in a cluster/view form or a box form. When the cluster/view form is selected the user interface system displays radio buttons 113. The user may select one of the radio buttons to indicate whether the search result should be displayed in mix view or lucky view. When the lucky view is selected, the user interface system may display the thumbnails of the images of the first cluster of the search result. The lucky view is a form of list view in that the user interface system selects the cluster (e.g., the first) whose thumbnails are to be displayed in the view panel. In this example, the mix view is selected as indicated by the selection of the mix view radio button, and the cluster/view form is selected as indicated by the shading in the view by area of the cluster/view form icon.

Figure 2:
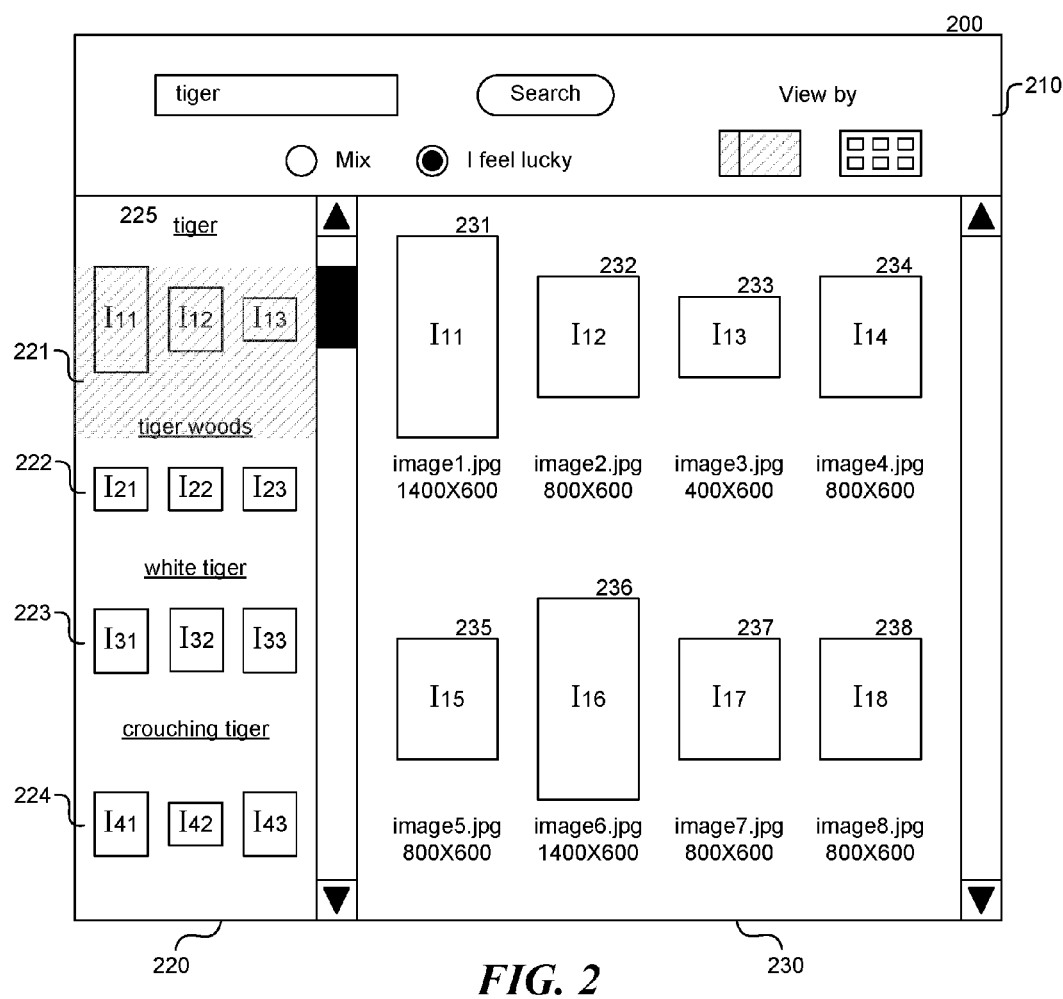
FIG. 2 illustrates a display page displaying images of a search result in cluster/view form in list view in one embodiment.

FIG. 2 illustrates a display page displaying images of a search result in cluster/view form in lucky view in one embodiment. A display page 200 includes a query panel 210, a cluster panel 220, and a view panel 230. The cluster panel includes cluster areas 221-224 and query link 225. Each cluster area includes a mini-thumbnail of the three most relevant images of the cluster along with the name of the cluster as a link. The images of the clusters are identified as $Ic,n$ where c indicates the cluster number and n indicates the image number within the cluster. For example, if the first cluster has 50 images, then the images are identified as $I1,1$ through $I1,50$. Since each cluster area contains mini-thumbnails for the first three images of the cluster, the mini-thumbnails are identified as $Ic,1$, $Ic,2$, and $Ic,3$ where c is the cluster number. The view panel includes thumbnails 231-238 identified as $I1,1$ through $I1,8$ along with metadata of the corresponding images. The metadata may include, for example, the name of the file that contains the image and the resolution of the image. The view panel is displaying a lucky view of the search result as indicated by the selection of the lucky view radio button. The shading of cluster area 221 indicates that the thumbnails for images of that cluster are currently displayed in the view panel. If a user selects query link 225, the user interface system may display thumbnails of images of the first cluster when in lucky view or of multiple clusters when in mix view. Alternately, if the image search result has a relevance score for each image relative to the image query, then the user interface system may display thumbnails from multiple clusters in relevance score order, rather than image relevance to cluster order.

Figure 3:
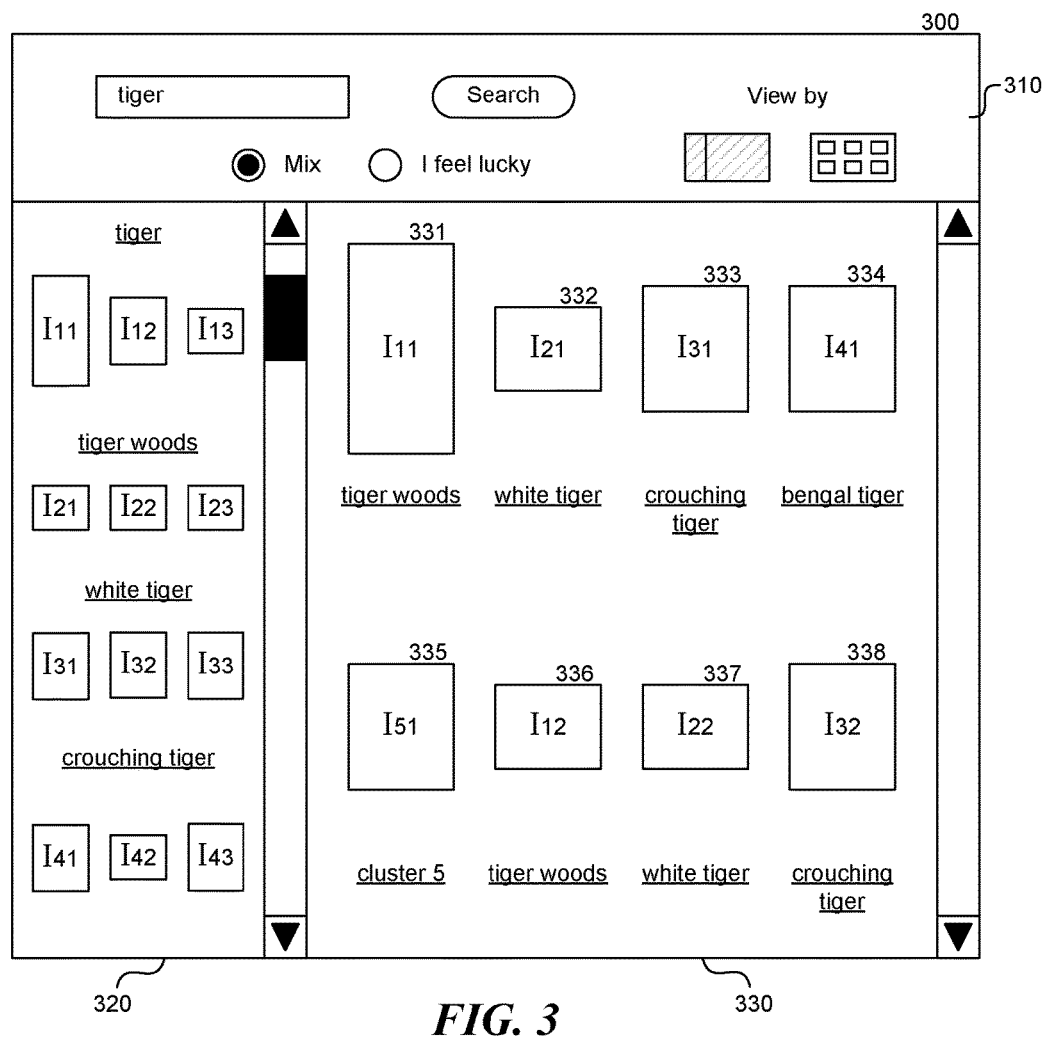
FIG. 3 illustrates a display page displaying images of a search result in mix view in one embodiment.

FIG. 3 illustrates a display page of images of a search result in mix view in one embodiment. A display page 300 includes a query panel 310, a cluster panel 320, and a view panel 330. The mix view is indicated by selection of the mix view radio button. The cluster panel contains the same content as that of FIG. 2. The view panel, however, displays thumbnails of images in mix view, that is, in image relevance to cluster order. The view panel contains thumbnails 331-338 for $I1,1$, $I2,1$, $I3,1$, $I4,1$, $I5,1$, $I1,2$, $I2,2$, and $I3,2$, respectively. The view panel may also include metadata associated with each thumbnail such as the name of the cluster that contains the image of the thumbnail, resolution of thumbnail, and so forth. The name of the cluster may also be a link that when selected, the user interface system display thumbnails of images of that cluster in the view panel.

Figure 4:
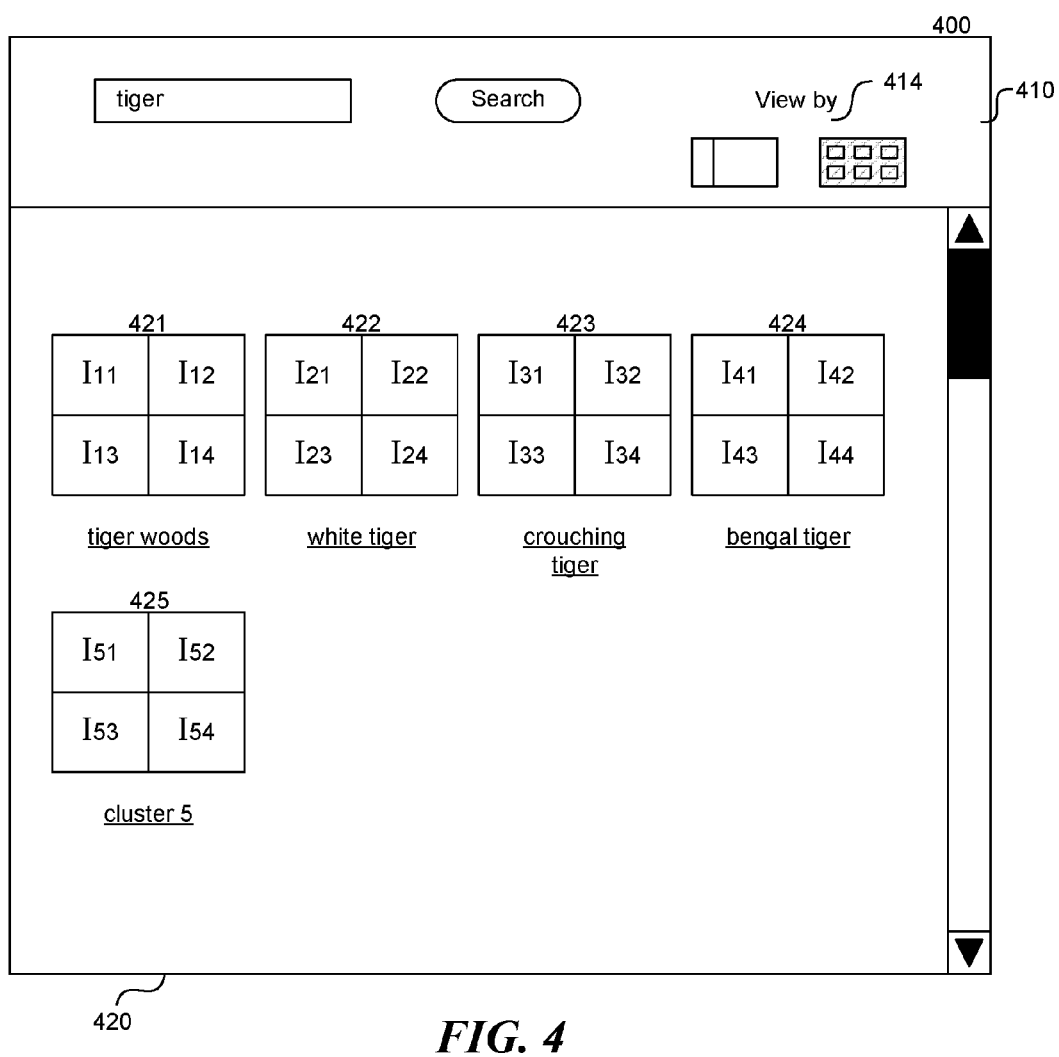
FIG. 4 illustrates a display page displaying clusters of a search result in a box form in one embodiment.

FIG. 4 illustrates a display page displaying clusters of a search result in a box form in one embodiment. A display page 400 includes a query panel 410 and a box panel 420. The box form is indicated by the shading of the box form icon in the view by area 414 of the query panel. The box panel contains a cluster area 421-425 for each cluster arranged in a grid. Each cluster area includes a mini-thumbnail for each of the four most relevant images arranged in a rectangle or box. Each cluster area also contains the name of the cluster. For example, cluster area 421 contains the name "Tiger Woods." When a user selects one of the cluster areas, the user interface displays thumbnails of the images of the cluster in a grid within the box panel.

Figure 5:
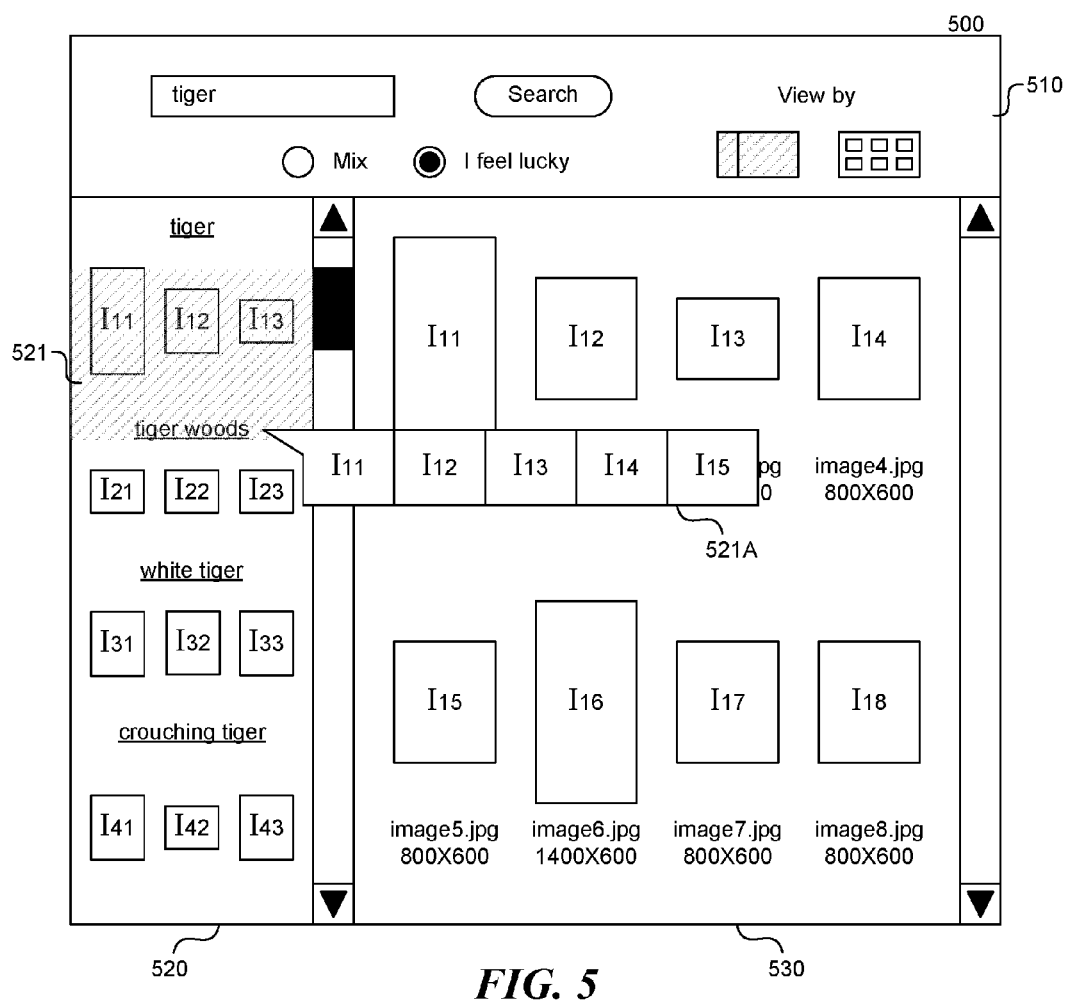
FIG. 5 illustrates a display page displaying a thumbnail list for a cluster area in one embodiment.

FIG. 5 illustrates a display page displaying a thumbnail list for a cluster area in one embodiment. The display page 500 includes a query panel 510, a cluster panel 520, and a view panel 530. When a user selects the cluster area 521, for example, by right clicking on or mouse hovering over the cluster area, the user interface system displays thumbnail list 521A near the cluster area. The thumbnail list contains mini-thumbnails for images of the cluster. When a user selects one of the mini-thumbnails, the user interface system displays a detail view of the image of the selected mini-thumbnail. The thumbnail list for any cluster area can be displayed to view more mini-thumbnails than are displayed in a cluster area and to allow selection of one or more of the mini-thumbnails.

Figure 6:
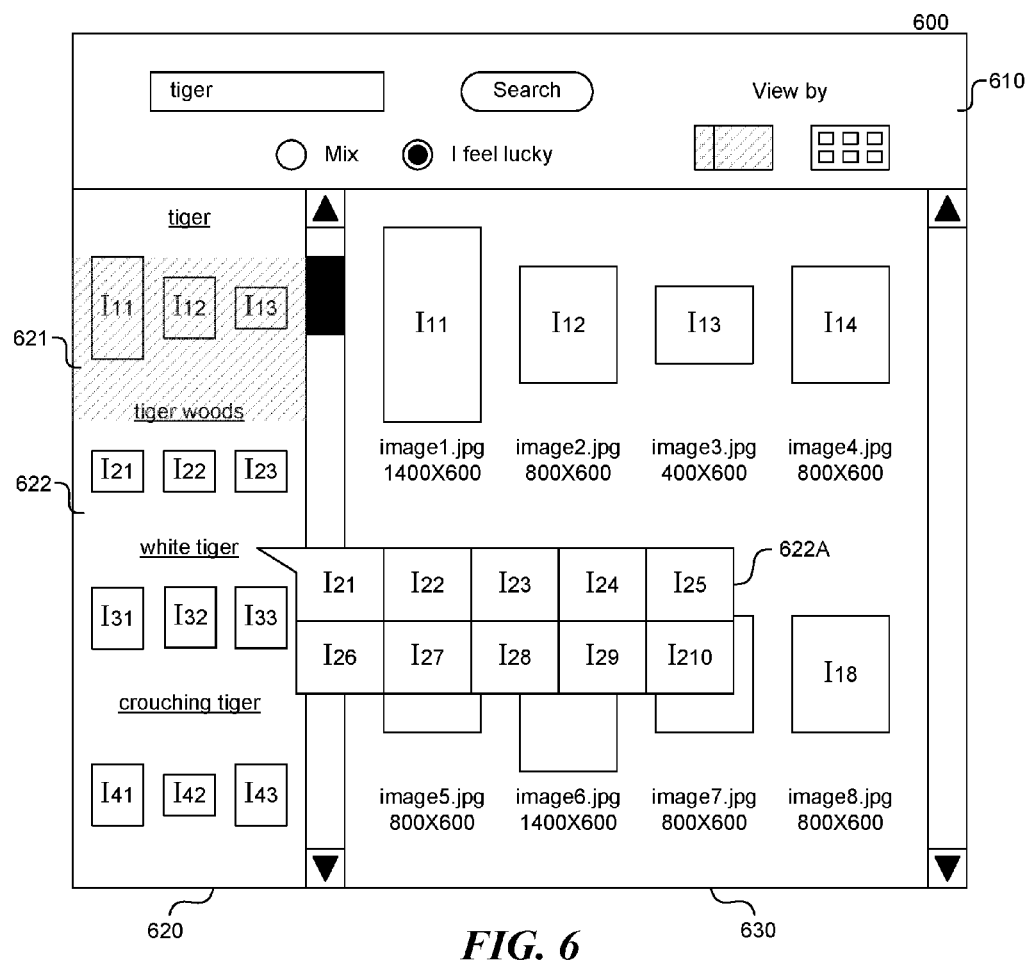
FIG. 6 illustrates a display page displaying a thumbnail list for a cluster area in one embodiment.

FIG. 6 illustrates a display page displaying a thumbnail list for a cluster area in one embodiment. The display page 600 includes a query panel 610, a cluster panel 620, and a view panel 630. When a user selects the cluster area 622, the user interface system displays thumbnail list 622A near the cluster area. The thumbnail list contains mini-thumbnails for images of the clusters. In this example, the view panel displays the thumbnails for the images of cluster area 621 as indicated by the shading, and the thumbnail list for cluster area 622 overlays the thumbnails of the view panel.

Figure 7:
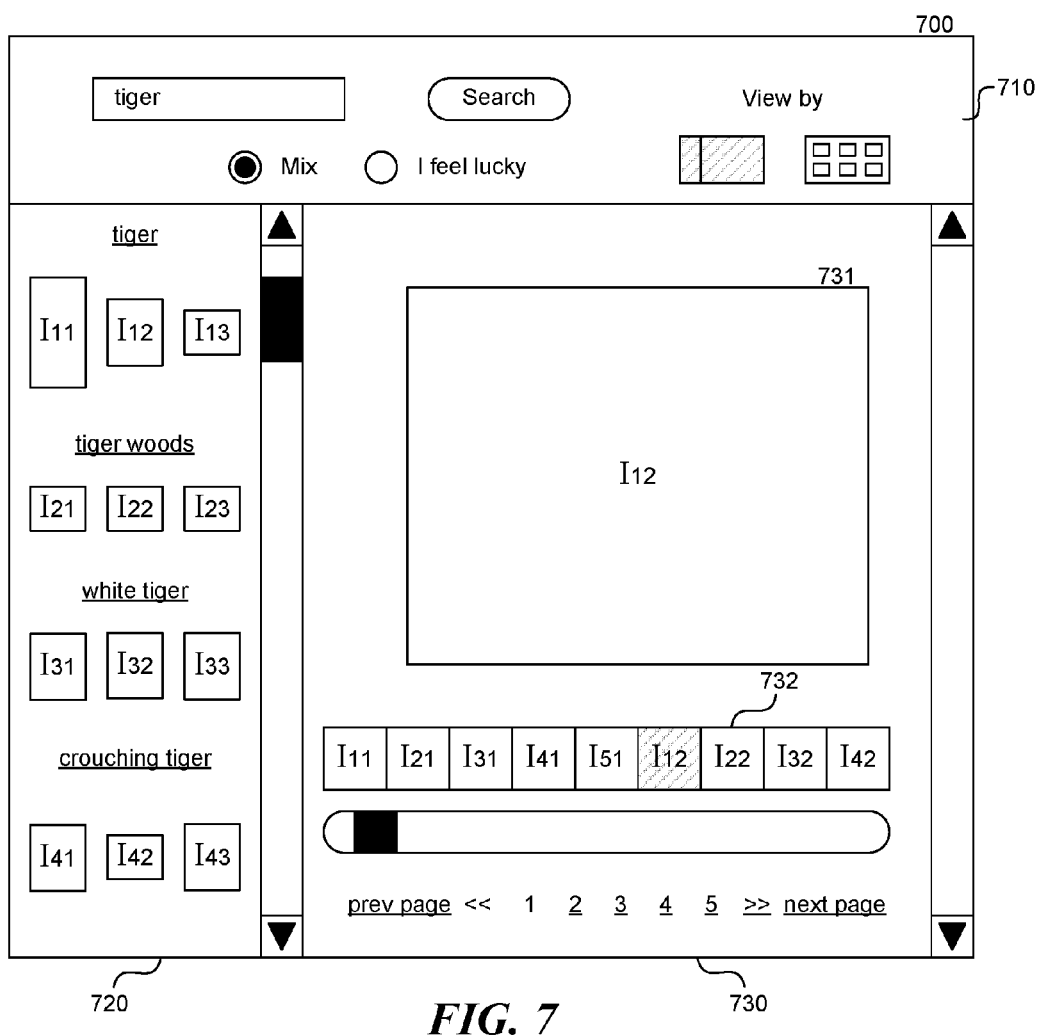
FIG. 7 illustrates a display page displaying a detail view of an image in one embodiment.

FIG. 7 illustrates a display page displaying a detail view in cluster/view form of an image in one embodiment. The display page 700 includes a query panel 710, a cluster panel 720, and a view panel 730. (In box form, the cluster panel would not be displayed.) The view panel contains a detail view of the second image of the first cluster $I_{1,2}$. The detail view includes image 731 and thumbnail scroll list 732. The thumbnail scroll list includes a mini-thumbnail of images associated with the context from which the image of the detail view was selected. In this example, the image was selected from a thumbnail for $I_{1,2}$ in a mix view. As a result, the thumbnail scroll list includes mini-thumbnails of images from the different clusters. In other cases, the thumbnail scroll list contains thumbnails of images of the same cluster as the selected image. When a user selects multiple thumbnails from a thumbnail list, the user interface may place each of the selected thumbnails in the thumbnail list and display a detail view of one of the images. A user can use the scroll bar of the thumbnail scroll list to scroll through the mini-thumbnails of the associated images. When a user selects a mini-thumbnail, the user interface displays a detail view of the image. The detail view may also include detailed metadata associated with the image including the name of the cluster that contains the image, the filename of the image, the resolution of the image, file size of the image, date of creation, and so on.

Figure 8:
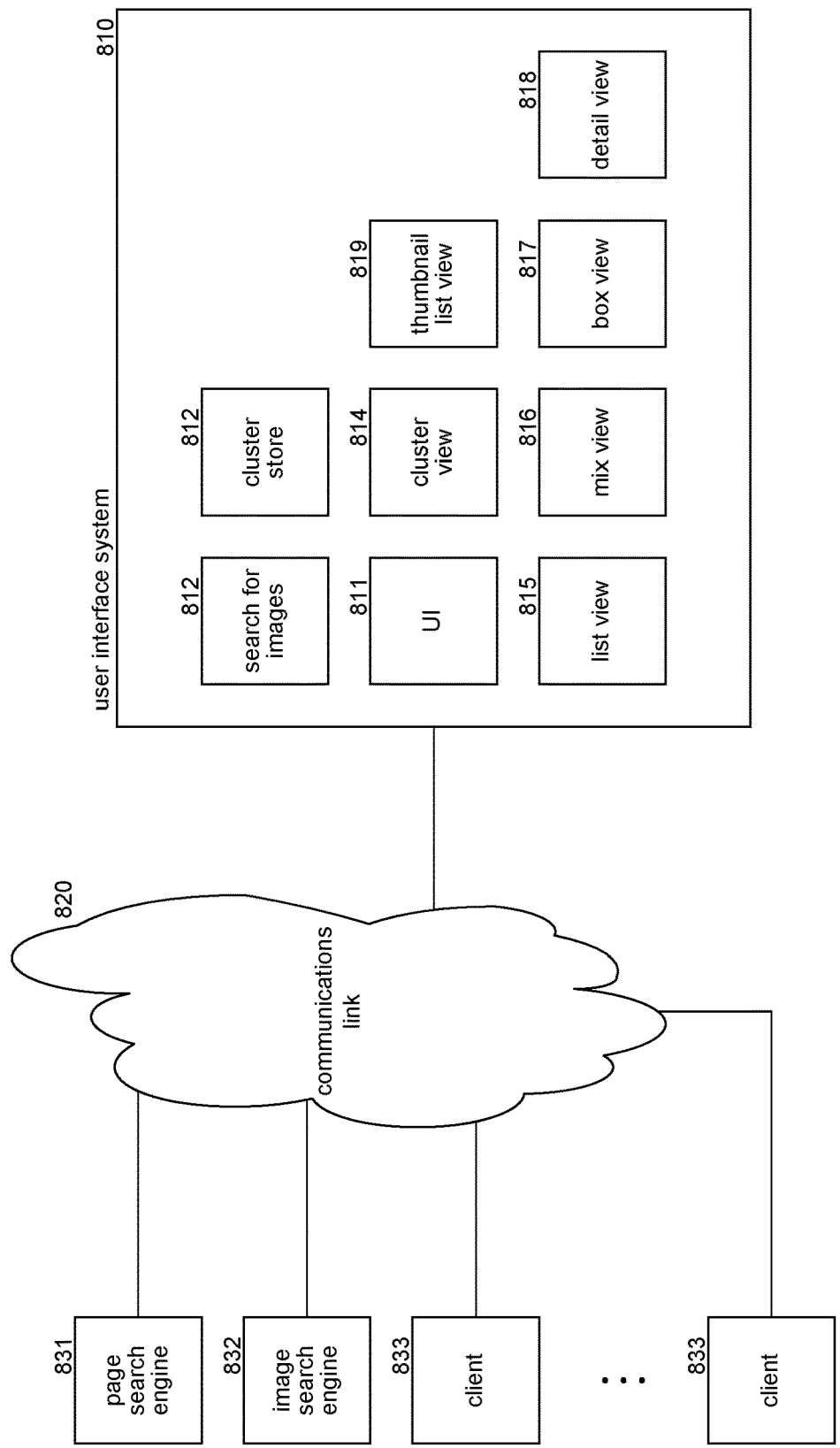
FIG. 8 is a block diagram that illustrates components of the user interface system in one embodiment.

FIG. 8 is a block diagram that illustrates components of the user interface system in one embodiment. The user interface system 810 is connected via a communications link 820 to a page search engine 831, an image search engine 832, and client computing devices 833. The user interface system includes a user interface component 811 and a search for images component 812. The search for images component is provided with an image query and generates a search result for the image query that includes clusters of images that are stored in a cluster store 813. The search for images component may submit the text of the image query to a conventional page search engine and receive a web page containing links to web pages along with snippets describing the web pages. The search for image component may identify key phrases from the web page and then submit each key phrase as an image query to an image search engine. The images of the search result for each key phrase correspond to a cluster that has the name of the key phrase. The search for images component is described in more detail in U.S. patent application Ser. No. 11/337,825, entitled "Generating Clusters of Images for Search Results" and filed concurrently, which is hereby incorporated by reference. The user interface system may, however, be used with any image search result that clusters images. The cluster store may contain an entry for each cluster that includes the name of the cluster and for each image of the cluster, a thumbnail, metadata, link to the image, and so on. The user interface system may generate mini-thumbnails as needed from the thumbnails. The thumbnails and mini-thumbnails can be of any size, and a mini-thumbnail can be the same size as a thumbnail.

The user interface component displays a query panel and submits an image query to the search for images component. Upon receiving the search result, the user interface component invokes the appropriate components to display the search result. The components for displaying the search result in different ways are a cluster view component 814, a list view component 815, a mix view component 816, a box view component 817, a detail view component 818, and a thumbnail list view component 819. The cluster view component controls the displaying of the cluster panel. The list view component controls the displaying of the view panel in list view. The mix view component controls the displaying of the view panel in mix view. The box view component controls the displaying of the box panel. The detail view component controls the displaying of the detail view of an image. The thumbnail list view component controls the displaying of a thumbnail list.

The computing devices on which the user interface system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the user interface system. In addition, the data structures and message structures may be stored or transmitted via a data transmission medium, such as a signal on a communications link. Various communications links may be used, such as the Internet, a local area network, a wide area network, or a point-to-point dial-up connection.

The user interface system may provide a user interface to various computing systems or devices including personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. The user interface system may also provide its services to various computing systems such as personal computers, cell phones, personal digital assistants, consumer electronics, home automation devices, and so on.

The user interface system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 9:
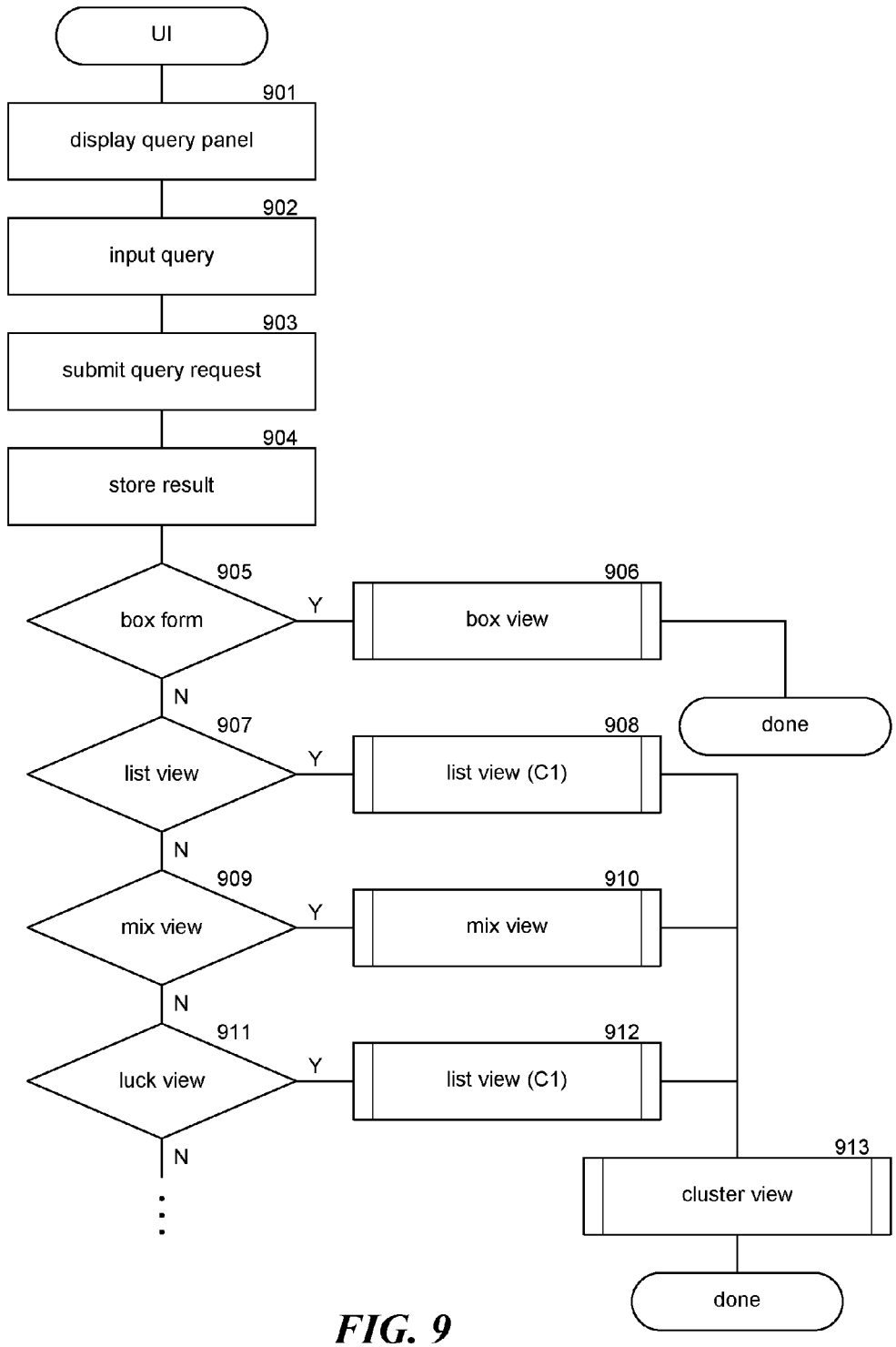
FIG. 9 is a flow diagram that illustrates the processing of the user interface component of the user interface system in one embodiment.

FIG. 9 is a flow diagram that illustrates the processing of the user interface component of the user interface system in one embodiment. In block 901, the component displays a query panel. In block 902, the component inputs an image query from a user. In block 903, the component submits the image query to the search for images component. In block 904, the component stores the search results in the cluster store. In decision block 905, if the box form is currently selected, then the component continues at block 906, else the component continues at block 907. In block 906, the component invokes the box view component to display a box form of the clusters and then completes. In decision block 907, the cluster/view form is selected. If list view is to be displayed, then the component continues at block 908, else the component continues at block 909. In block 908, the component invokes the list view component passing an indication to display thumbnails of the first cluster in the view panel. In decision block 909, if the mix view is to be displayed, then the component continues at block 910, else the component continues at block 911. In block 910, the component invokes the mix view component to display thumbnails for the mix view in the view panel. In block 911, if the lucky view is to be displayed, then the component continues at block 912, else the component continues further processing. In block 912, the component invokes the list view component passing an indication to display the thumbnails of the first cluster. In block 913, the component invokes the cluster view component to generate the display for the cluster panel and then completes.

Figure 10:
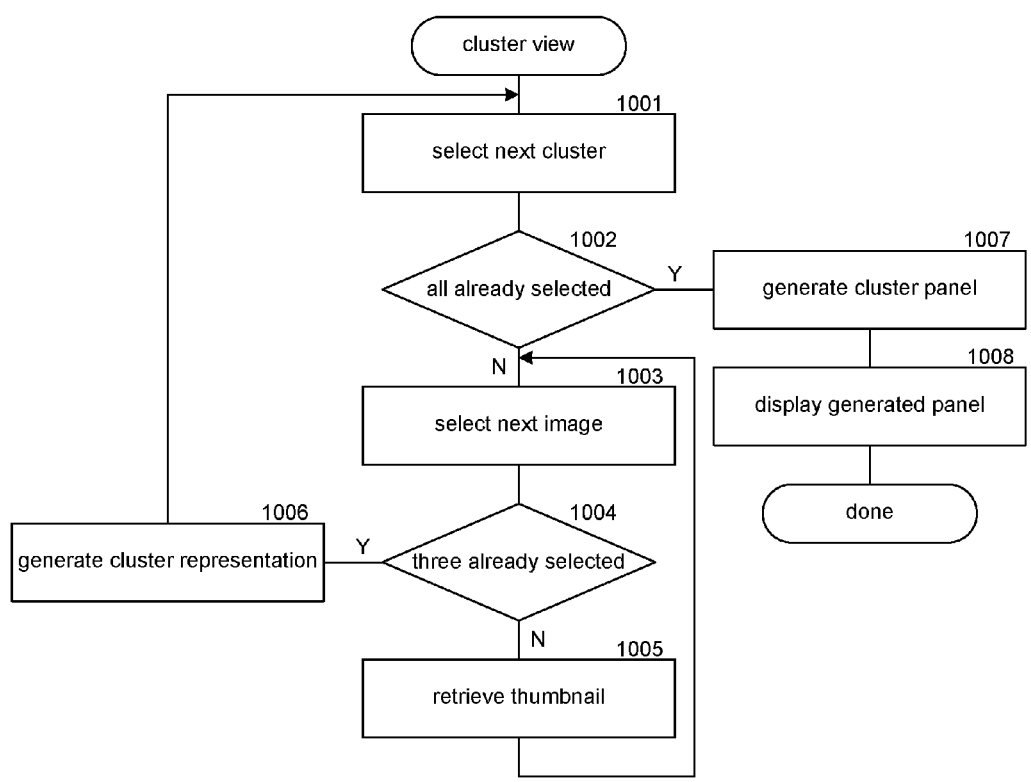
FIG. 10 is a flow diagram that illustrates the processing of the cluster view component of the user interface system in one embodiment.

FIG. 10 is a flow diagram that illustrates the processing of the cluster view component of the user interface system in one embodiment. The component loops selecting each cluster and generating a cluster area for the cluster panel. In block 1001, the component selects the next cluster. In decision block 1002, if all the clusters have already been selected, then the component continues at block 1007, else the component continues at block 1003. In block 1003, the component selects the next image of the selected cluster starting with the first image. In decision block 1004, if three images have already been selected for the selected cluster, then the component continues at block 1006, else the component continues at block 1005. In block 1005, the component retrieves the thumbnail for the selected image and then loops to block 1003 to select the next image. In block 1006, the component generates the cluster area for the selected cluster and then loops to block 1001 to select the next cluster. In block 1007, the component generates the cluster panel. In block 1008, the component displays the generated panel and then completes.

Figure 11:
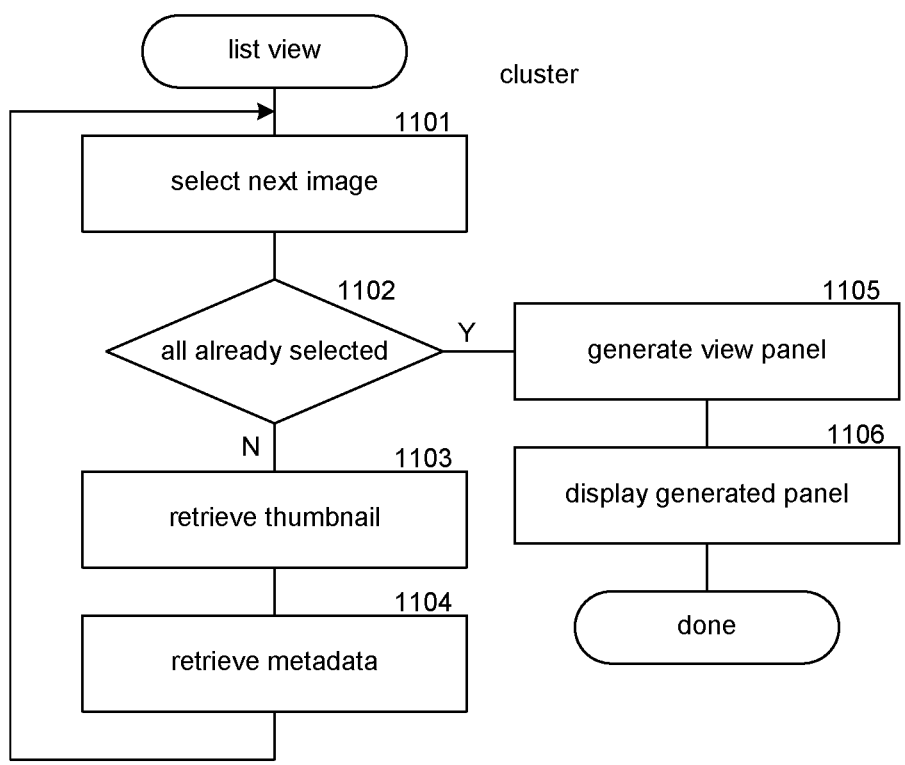
FIG. 11 is a flow diagram that illustrates the processing of the list view component of the user interface system in one embodiment.

FIG. 11 is a flow diagram that illustrates the processing of the list view component of the user interface system in one embodiment. The component loops selecting images of the passed cluster. In block 1101, the component selects the next image of the passed cluster. In decision block 1102, if all the images of the passed cluster have already been selected, then the component continues at block 1105, else the component continues at block 1103. In block 1103, the component retrieves the thumbnail for the selected image. In block 1104, the component retrieves metadata for the selected image and then loops to block 1101 to select the next image. In block 1105, the component generates the view panel for the list view. In block 1106, the component displays the generated panel and then completes.

Figure 12:
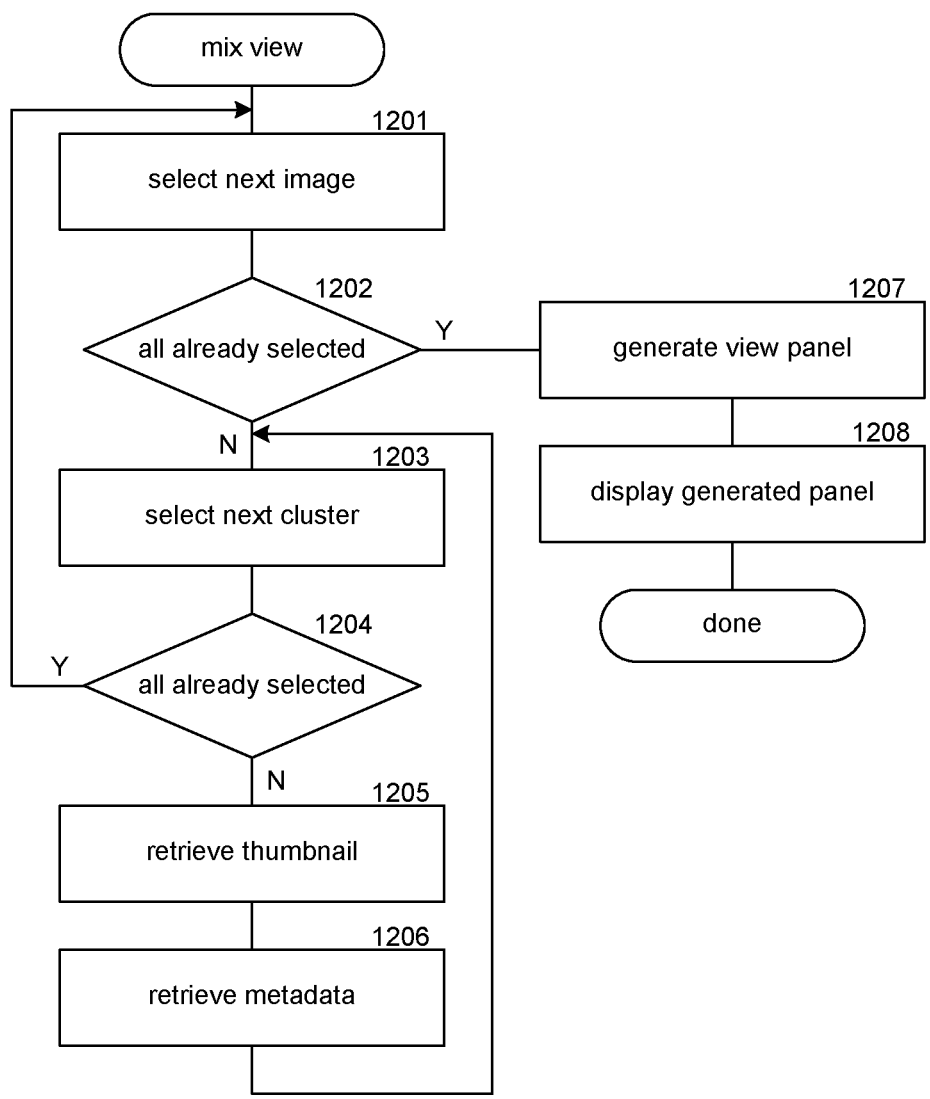
FIG. 12 is a flow diagram that illustrates the processing of the mix view component of the user interface system in one embodiment.

FIG. 12 is a flow diagram that illustrates the processing of the mix view component of the user interface system in one embodiment. The component loops selecting images from the various clusters and generating a mix view using an image relevance to cluster order. In block 1201, the component selects the next image starting with the first image. In block 1202, if all the images have already been selected, then the component continues at block 1207, else the component continues at block 1203. In block 1203, the component selects the next cluster starting with the first cluster. In decision block 1204, if all the clusters have already been selected for the selected image, then the component loops to block 1201 to select the next image, else the component continues at block 1205. In block 1205, the component retrieves the thumbnail for the selected image of the selected cluster. In block 1206, the component retrieves the metadata for the selected image of the selected cluster. The component then loops to block 1203 to select the next cluster. In block 1207, the component generates a view panel for the mix view. In block 1208, the component displays the generated view panel and then completes.

Figure 13:
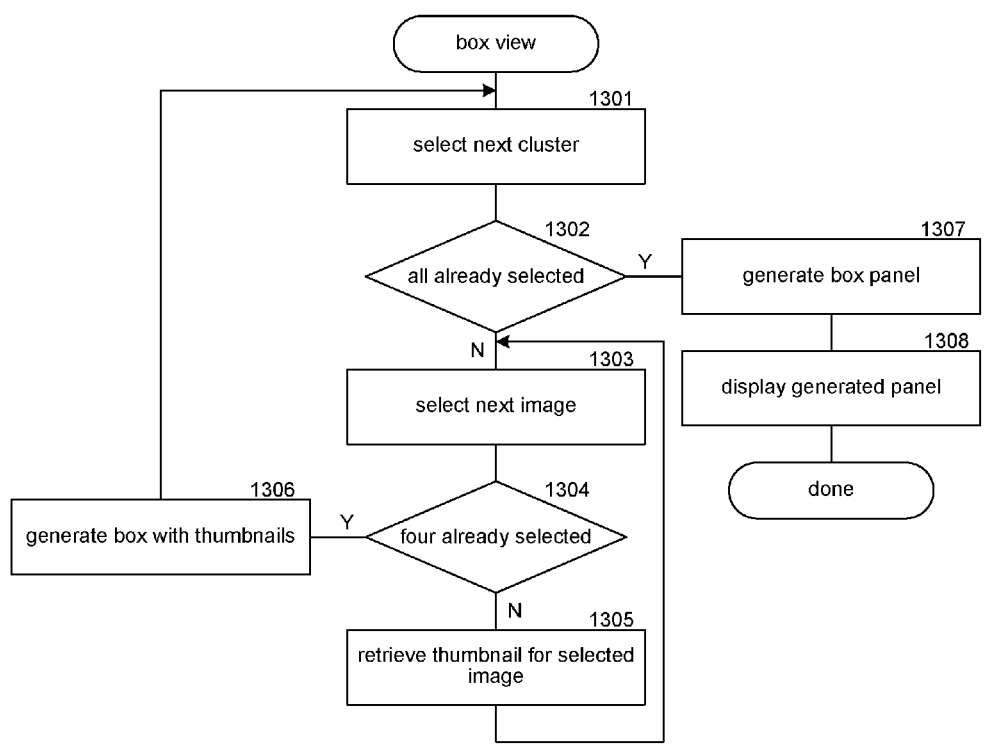
FIG. 13 is a flow diagram that illustrates the processing of the box view component of the user interface system in one embodiment.

FIG. 13 is a flow diagram that illustrates the processing of the box view component of the user interface system in one embodiment. The component loops selecting each cluster and images within each cluster to generate a box form. In block 1301, the component selects the next cluster. In decision block 1302, if all the clusters have already been selected, then the component continues at block 1307, else the component continues at block 1303. In block 1303, the component selects the next image of the selected cluster. In decision block 1304, if four of the images for the selected cluster have already been selected, then the component continues at block 1306, else the component continues at block 1305. In block 1305, the component retrieves the thumbnail for the selected image of the selected cluster and then loops to block 1303 to select the next image. In block 1306, the component generates a box of the selected thumbnails and then loops to block 1301 to select the next cluster. In block 1307, the component generates the box panel with the boxes of the clusters in a grid. In block 1308, the component displays the generated panel and then completes.

Figure 14:
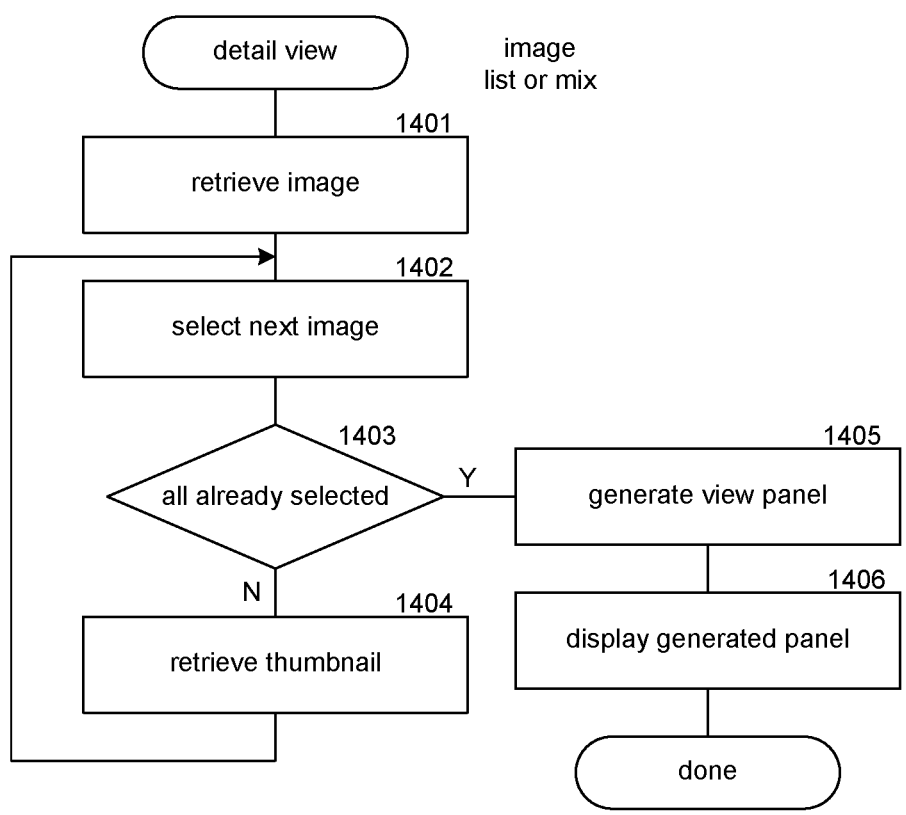
FIG. 14 is a flow diagram that illustrates the processing of the detail view component of the user interface system in one embodiment.

FIG. 14 is a flow diagram that illustrates the processing of the detail view component of the user interface system in one embodiment. The component is passed an image and an indication of whether the image was selected from a list or a mix view. In block 1401, the component retrieves the image. In block 1402, the component selects the next image associated with the list or mix view. In decision block 1403, if all the images have already been selected, then the component continues at block 1405, else the component continues at block 1404. In block 1404, the component retrieves the thumbnail for the selected image for use in the thumbnail scroll list. The component then loops to block 1402 to select the next image. In block 1405, the component generates a view panel for a detail view. In block 1406, the component displays the generated panel and then completes.

Figure 15:
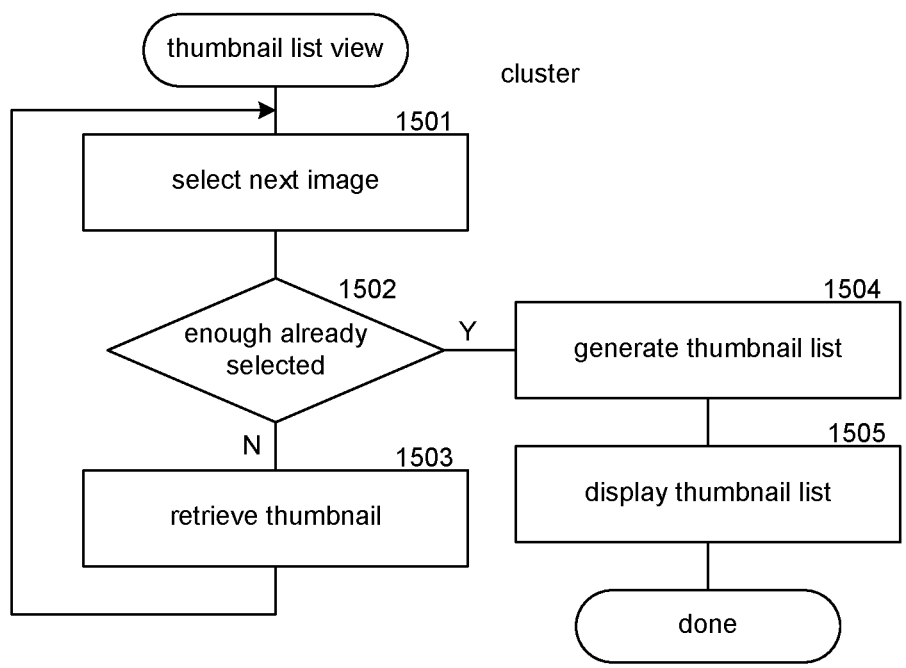
FIG. 15 is a flow diagram that illustrates the processing of the thumbnail list view component of the user interface system in one embodiment.

FIG. 15 is a flow diagram that illustrates the processing of the thumbnail list view component of the user interface system in one embodiment. The component is passed an indication of a cluster and generates a thumbnail list for that cluster. In block 1501, the component selects the next image of the cluster starting with the first image. In decision block 1502, if all images have been selected for the thumbnail list, then the component continues at block 1504, else the component continues at block 1503. In block 1503, the component retrieves a mini-thumbnail for the selected image and then loops to block 1501 to select the next image. In block 1504, the component generates the thumbnail list using the retrieved mini-thumbnails. In block 1505, the component displays the generated thumbnail list and then completes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. The user interface system may be used to present content of various types, such as photographs, drawings, artwork, videos, music, and so on. Accordingly, the invention is not limited except as by the appended claims.

We claim:

1. A computing device for presenting an image search result having clusters of images, the computing device comprising:
    a memory storing computer-executable instructions that when executed:
    receive an image search query;
    identify an image search result of images that are relevant to the image search query, each image having a relevance score indicating relevance of the image to the image search query; the images being organized into clusters;
    display in a cluster panel a cluster indication of each cluster, the cluster indication for a cluster including thumbnails of multiple images from the cluster, the cluster indications being ordered based on relevance of the images in the cluster to the image search query; and
    display in a view panel thumbnails of images from multiple clusters of the image search result, the thumbnails of images displayed in the view panel being ordered based on relevance of the images to the image search query, wherein the respective thumbnails include functionality to display an image corresponding to a respective thumbnail in a detail view in the view panel upon user selection of the respective thumbnail;
    wherein the cluster panel and the view panel are displayed simultaneously, and
    a processor that executes the computer-executable instructions stored in the memory.

2. The computing device of claim 1 wherein the computer-executable instructions further include instructions that when executed: when in list view, when a user selects a cluster indication, display in the view panel thumbnails of images of the cluster corresponding to the selected cluster indication.

3. The computing device of claim 1 wherein the computer-executable instructions further include instructions that when executed: when in list view, when a user selects a cluster indication, display adjacent to the selected cluster indication a mini-thumbnail of images of the cluster corresponding to the selected cluster indication.

4. The computing device of claim 1 wherein the computer-executable instructions further include instructions that when executed: when in list view,
    when a user selects a cluster indication using a first selection, display in the view panel thumbnails of images of the cluster corresponding to the selected cluster indication; and
    when a user selects a cluster indication using a second selection, display adjacent to the selected cluster indication a mini-thumbnail of images of the cluster corresponding to the selected cluster indication.

5. The computing device of claim 4 wherein the computer-executable instructions further include instructions that when executed: display along with the detail view a thumbnail scroll list of the thumbnails of the view panel when the user selected the thumbnail.

6. The computing device of claim 1 wherein the computer-executable instructions further include instructions that when executed: when in a mix view, display in the view panel thumbnails of the images of the clusters in which the images of all the clusters are ordered into a combined ordering such that the most relevant image taken from each cluster are listed first in the combined ordering followed by a listing of the second most relevant image taken from each cluster in the combined ordering, wherein the other images of all the clusters are further listed in the combined ordering in an order based on relevance of each image within its cluster.

7. A method performed by a computing device to present an image search result having clusters of images, the method comprising:
receiving an image search query;
identifying an image search result of images that are relevant to the image search query, each image having a relevance score indicating relevance of the image to the image search query, the images being organized into clusters;
displaying in a cluster panel a cluster indication of each cluster, the cluster indication for each cluster including thumbnails of multiple images from that cluster, the cluster indications being ordered based on relevance of the images in the cluster to the image search query; and
displaying in a view panel thumbnails of images of one or more clusters wherein the cluster panel and the view panel are displayed simultaneously, wherein the respective thumbnails include functionality to display an image corresponding to a respective thumbnail in a detail view in the view panel upon user selection of the respective thumbnail.

8. The method of claim 7 wherein when in list view and, when a user selects a cluster indication, displaying in the view panel thumbnails of images of the cluster corresponding to the selected cluster indication.

9. The method of claim 7 wherein when in a mix view, displaying in the view panel thumbnails of the images of the clusters in which the images of all the clusters are ordered into a combined ordering such that the most relevant image taken from each cluster are listed first in the combined ordering followed by a listing of the second most relevant image taken from each cluster in the combined ordering, wherein the other images of all the clusters are further listed in the combined ordering in an order based on relevance of each image within its cluster.

10. The method of claim 7 wherein when in list view, when a user selects a cluster indication using a first selection, displaying in the view panel thumbnails of images of the cluster corresponding to the selected cluster indication; and
when a user selects a cluster indication using a second selection, displaying adjacent to the selected cluster indication a mini-thumbnail of images of the cluster corresponding to the selected cluster indication.

11. The method of claim 10 wherein including displaying along with the detail view a thumbnail scroll list of the thumbnails of the view panel when the user selected the thumbnail.

12. The method of claim 7 wherein when in list view and; when a user selects a cluster indication, displaying adjacent to the selected duster indication a mini-thumbnail of images of the cluster corresponding to the selected cluster indication.

13. The method of claim 11 wherein the thumbnails of the view panel are ordered based on relevance of the images to the image search query.

14. A method performed by a computing device for presenting an image search result having clusters of images, the method comprising:
storing in a store an image search result of images that are relevant to an image search query, each image having a relevance score indicating relevance of the image to the image search query, the images being organized into clusters;
displaying in a cluster panel a cluster indication of each cluster, the cluster indication of a cluster including thumbnails of multiple images from the cluster, the cluster indications are ordered based on relevance of the images in the cluster to the image search query; and
when in a mix view, displaying in the view panel thumbnails of the images of the clusters in which the images of all the clusters are ordered in a combined ordering such that the most relevant image of each cluster is listed first in the combined ordering followed by a listing of the second most relevant image of each cluster.

15. The method of claim 14 including when in list view and when a user selects a cluster indication, displaying in the view panel thumbnails of images of the cluster corresponding to the selected cluster indication.

16. The method of claim 14 including when in list view and when a user selects a cluster indication, displaying adjacent to the selected cluster indication a mini-thumbnail of images of the cluster corresponding to the selected cluster indication.

17. The method of claim 14 including when in list view, when a user selects a cluster indication using a first selection, displaying in the view panel thumbnails of images of the cluster corresponding to the selected cluster indication; and
when a user selects a cluster indication using a second selection, displaying adjacent to the selected cluster indication a mini-thumbnail of images of the cluster corresponding to the selected cluster indication.

18. The method of claim 14 including when in list view, when a user selects a thumbnail of an image, displaying in the view panel a detailed view of that image.

19. The method of claim 18 including displaying along with the detail view a thumbnail scroll list of the thumbnails of the view panel when the user selected the thumbnail.

20. The method of claim 14 wherein the cluster indications are ordered based on relevance of the images in the cluster to the image search query and the thumbnails of the view panel are ordered based on relevance of the images to the image search query.

* * * * *